United States Patent
Prakash

(10) Patent No.: US 8,611,263 B2
(45) Date of Patent: Dec. 17, 2013

(54) METHODS AND APPARATUS FOR SAVING POWER BY DESIGNATING FRAME INTERLACES IN COMMUNICATION SYSTEMS

(75) Inventor: Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1478 days.

(21) Appl. No.: 11/260,928

(22) Filed: Oct. 27, 2005

(65) Prior Publication Data

US 2007/0097894 A1    May 3, 2007

(51) Int. Cl.
*G08C 17/00* (2006.01)
(52) U.S. Cl.
USPC ............. 370/311; 370/47; 370/337; 370/235; 370/329; 455/522; 455/127.1; 455/452
(58) Field of Classification Search
USPC ............... 455/452, 522, 127.1; 370/347, 337, 370/311, 235, 329
See application file for complete search history.

(56) References Cited

U.S. PATENT DOCUMENTS

| | | | | |
|---|---|---|---|---|
| 5,887,263 | A * | 3/1999 | Ishii | 455/452.1 |
| 6,072,784 | A | 6/2000 | Agrawal et al. | |
| 6,594,233 | B1 * | 7/2003 | Hicks | 370/235 |
| 2002/0064140 | A1 | 5/2002 | Numminen | |
| 2002/0114309 | A1 * | 8/2002 | Chow et al. | 370/347 |
| 2003/0072384 | A1 | 4/2003 | Chen et al. | |
| 2004/0037245 | A1 | 2/2004 | Grilli et al. | |
| 2004/0180701 | A1 | 9/2004 | Livet et al. | |
| 2005/0111533 | A1 * | 5/2005 | Berkman et al. | 375/220 |

FOREIGN PATENT DOCUMENTS

| | | |
|---|---|---|
| JP | 04304721 | 10/1992 |
| JP | 2002158609 A | 5/2002 |
| JP | 2003502959 T | 1/2003 |
| JP | 2003229811 | 8/2003 |
| KR | 20020088055 | 11/2002 |
| RU | 2111619 C1 | 5/1998 |
| RU | 99100093 | 11/2000 |
| TW | 549002 B | 2/2000 |
| TW | 560136 B | 8/2001 |
| TW | 584994 | 4/2004 |
| WO | WO9724003 | 7/1997 |
| WO | WO0079805 A1 | 12/2000 |
| WO | WO0215420 | 2/2002 |

OTHER PUBLICATIONS

International Search Report-PCT/US2006/060334, International Search Authority-European Patent Office-May 8, 2007.
Written Opinion-PCT/US2006/060334, International Search Authority-European Patent Office-May 8, 2007.

(Continued)

*Primary Examiner* — Patrick Edouard
*Assistant Examiner* — Fred Casca
(74) *Attorney, Agent, or Firm* — Nerrie M. Zohn

(57) ABSTRACT

The disclosed embodiments provide for methods and systems for designating at least one frame interlace out of a set of frame interlaces, by identifying a number of frame interlaces, wherein information may be communicated on the identified frame interlaces, and designating the identified frame interlaces to at least one access terminal, such that the access terminal may save power by monitoring only the designated frame interlaces.

32 Claims, 7 Drawing Sheets

(56) References Cited

OTHER PUBLICATIONS

International Preliminary Report on Patentability-PCT/US2006/060334, International Bureau of WIPO-Geneva, Switzerland-Apr. 29, 2008.

3rd Generation Partnership Project (3GPP); "3rd Generation Partnership Project; Technical Specification Group Radio Access Network; Terminal Power Saving Features (Release 4)"; 3GPP TR 25.840 V4.0.0; Dec. 2003; pp. 1-30; XP003001813; 3GPP; Sophia Antipolis, Valbonne, France.

Taiwan Search Report—TW095139921—TIPO—Jul. 1, 2011.

* cited by examiner

METHODS AND APPARATUS FOR SAVING POWER BY DESIGNATING FRAME INTERLACES IN COMMUNICATION SYSTEMS

BACKGROUND

I. Field

The present invention relates generally to communications and more specifically to techniques for saving power by efficiently designating a number of frame interlaces in a communication system.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink, Packet Access (HSDPA), Time Division Multiple Access (TDMA) systems, Frequency Division Multiple Access (FDMA) systems, and Orthogonal Frequency Division Multiple Access (OFDMA) systems.

A communication system may employ frame interlaces to communicate information. There is therefore a need in the art for techniques to designate an optimum number of frame interlaces that would improve power consumption.

SUMMARY

The disclosed embodiments provide for methods and systems for designating at least one frame interlace out of a set of frame interlaces, by identifying a first number of frame interlaces, wherein information may be communicated on the identified frame interlaces, and designating the identified frame interlaces to at least one access terminal, such that the access terminal may save power by monitoring only the designated frame interlaces.

The disclosed embodiments also provide for methods and systems for requesting a number of frame interlaces by identifying a number of frame interlaces that an access terminal can monitor, based on at least available power at the access point, and providing the identified number of frame interlaces to an access point:

The disclosed embodiments also provide for methods and systems changing a designated set of frame interlaces from a first number to a second number by receiving a request for changing a designated set of frame interlaces from a first number to a second number, identifying a second number of frame interlaces, and designating the identified second number of frame interlaces to the access point, such that the access terminal may save power by monitoring only the designated second number of frame interlaces.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
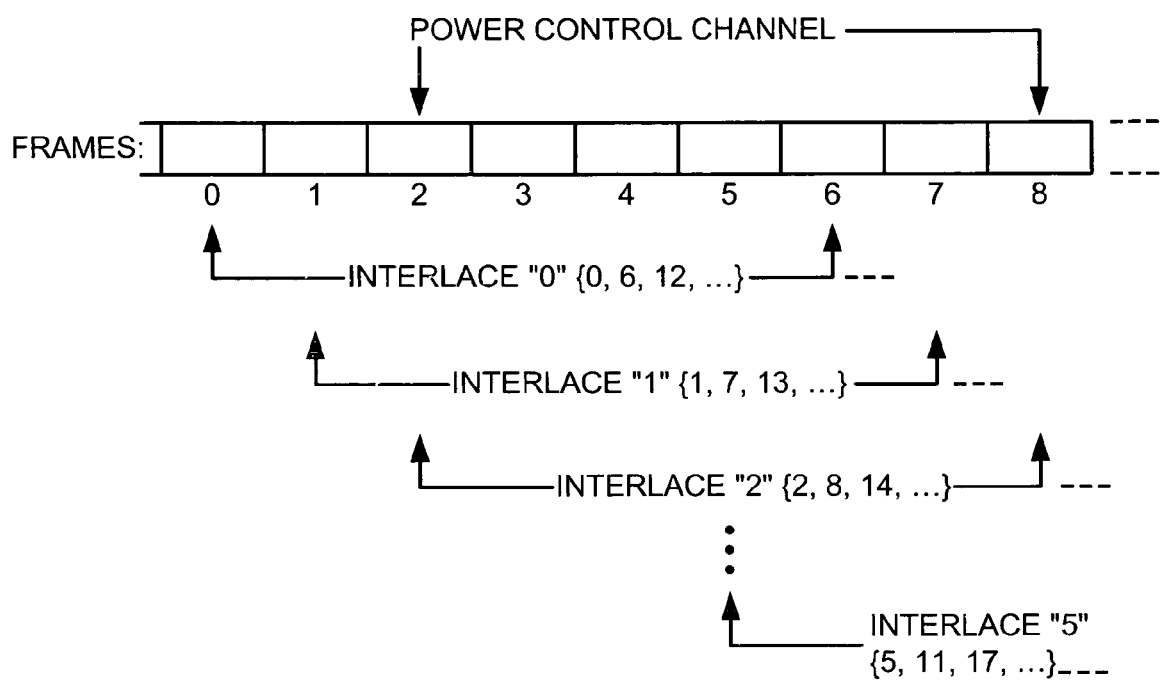
FIG. 1 shows one embodiment for frame interlace allocation.

The word "exemplary" is used herein to mean "serving as an example, instance, or illustration." Any embodiment or design described herein is "exemplary" and is not necessarily to be construed as preferred or advantageous over other embodiments or designs.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may comprise an IP network, by converting received air-interface frames to IP packets. Access point also coordinates the management of attributes for the air interface.

In one embodiment, an access terminal and an access point may operate in one of two modes: "selected-interlace-mode-on" or "selected-interlace-mode-off." In the selected-interlace-mode-on mode, an access point sends certain assignments to an access terminal only on a set of designated frame interlaces called the "selected-interlace -set." In the selected-interlace-mode-off mode, no restrictions are placed on the frames on which the access point and access terminal may communicate.

In one embodiment, an access point may enter the "selected-interlace-mode-on" mode upon sending a "selected-interlace" message with "enable bit" set to "1," and an access terminal may enter the "selected-interlace-on-mode" mode upon receiving a "selected-interlace" message with "enable bit" set to "1" The access terminal may enter the "selected-interlace-mode-off" mode upon receiving a "selected -interlace" message with "enable bit" set to "0," or upon handoff. The access point may enter the "selected-interlace-mode-off" mode upon sending a "selected-interlace" message with "enable bit" set to "0," or upon handoff. When an access terminal receives a "selected-interlace-off" message with "enable bit" set to "0," the access terminal may respond with a "selected-interlace-acknowledgement" message.

To change an existing selected-interlace assignment to an access terminal, the access point may first disable the existing "selected-interlace-mode," and then send a new "selected-interlace" message. Upon entering the "selected-interlace -mode-on" mode, an access terminal and access point may generate "selected-interlace-enabled" indications, and upon entering the "selected-interlace-off" mode, the access terminal and access point may generate "selected-interlace-disabled" indications.

FIG. 1 shows one embodiment of frame-interlace allocation for communicating assignments on selected frames. The AP may communicate assignment with an AT on one or more designated frame interlaces. A frame interlace may include a periodic or non-periodic group of frames. For example, frame interlace "0" may include frames {0, 6, 12, . . . }; frame interlace "1" may include frames {1, 7, 13, . . . }; frame interlace "2" may include frames {2, 8, 14, . . . }; and frame interlace "5" may include frames {5, 11, 17, . . . }. In one embodiment, the AP may employ one or more frame interlaces to communicate information to an AT. For example, after sending frame "0" of frame interlace "0", if the AP receives an acknowledgement (ACK) from the target AT, the AP sends new information in frame "6." Otherwise the AP may resend the same information in frame "6."

In one embodiment, the AP may employ some or all available frame interlaces, as shown in FIG. 1, for communicating assignments. However, an AT needs to read all the frames for possible availability of assignments. In this case, precious power will be wasted at the AT. Therefore, AT power may be saved if the AT and the AP negotiate which frame interlaces are being employed by the AP. For example, if it is negotiated that the AP will send assignments only on frame interlaces "0" and "2", then AT would only need to monitor or read frames 0, 2, 6, 8, 12, 14, and so on.

In one embodiment, the number and identity of the selected frame interlaces are negotiated between the AP and the AT. For example, the AT may request a first number of frame interlaces that AT may afford to monitor, based on the available power or other considerations. The AT may also request an increase or decrease in the number of frame interlaces already designated by the AP. In response, the AP accommodates the request received from the AT, and informs the AT of a designated second number of selected frame interlaces.

The AP may designate a number of frame interlaces based on several factors. In one embodiment, the access point avoids to designate the same frame interlaces to two or more ATs. In another embodiment, the AP may align a designated frame interlace with the frames that carry power control channel. For example, as shown in FIG. 1, if the power control channel is carried on frame interlace "2," one of the frame interlaces that the AP designates would be frame interlace "2." In another embodiment, the AP may align a designated frame interlace with the frames adjacent or as close as possible to the frames that carry power control channel. For example as shown in FIG. 1, if the power control channel is carried on frame interlace "2," a second one of the frame interlaces that the AP designates would be either frame interlace "1" or frame interlace "3."

Figure 2:
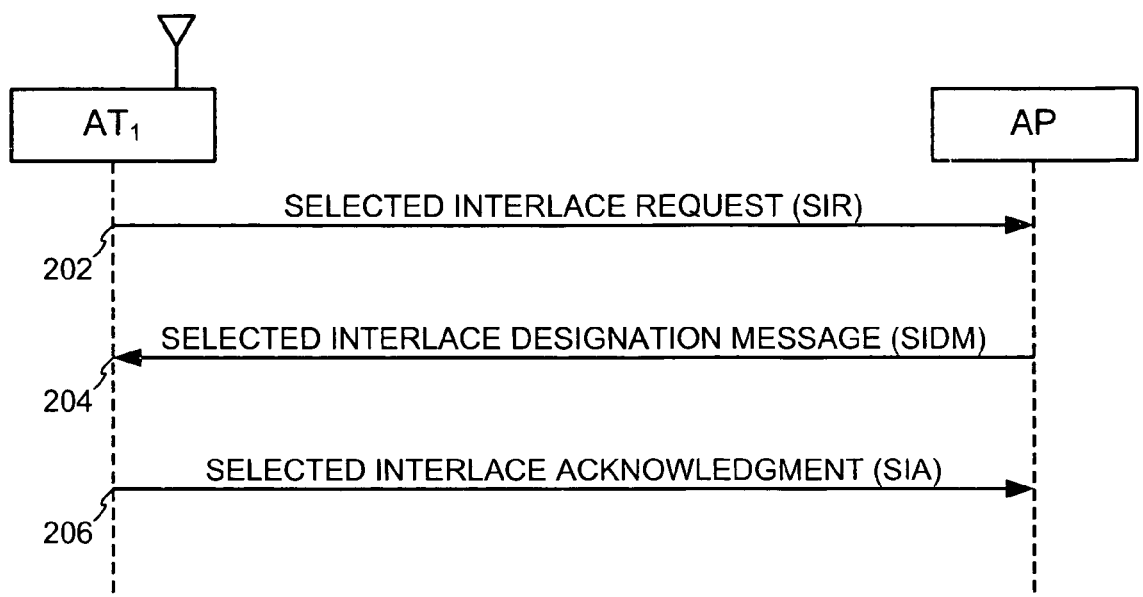
FIG. 2 shows one flow diagram for designating frame interlaces.

FIG. 2 shows one flow diagram for designating frame interlaces. In step 202, an AT may send a selected-interlace-request (SIR), to request selected-frame-interlace-mode. The request may include a message ID, an identification of the target AP or a sector to which the request is directed, e.g., PilotPN of the target sector, and/or number of interlaces, which may be based on the available power at the AT. In step 204, the AP may send a selected-interlace-designation-message (SIDM) to assign selected-interlace-mode to the AT. The SIDM message may include a message ID, the number of designated interlaces assigned to the AT, an ID assigned to each assigned interlace, and/or an identification of the AP or the sector that sent this message, e.g., PilotPN of the sending sector. In step 206, the AT may send a selected interlace acknowledgement (SIA) upon receiving an SIDM message.

The SIA message may include a message ID, an identification of the target AP or a sector to which the SIA message is directed, e.g., PilotPN of the target sector, and an indication that the AT has enabled its selected-interlace-mode.

Figure 3:
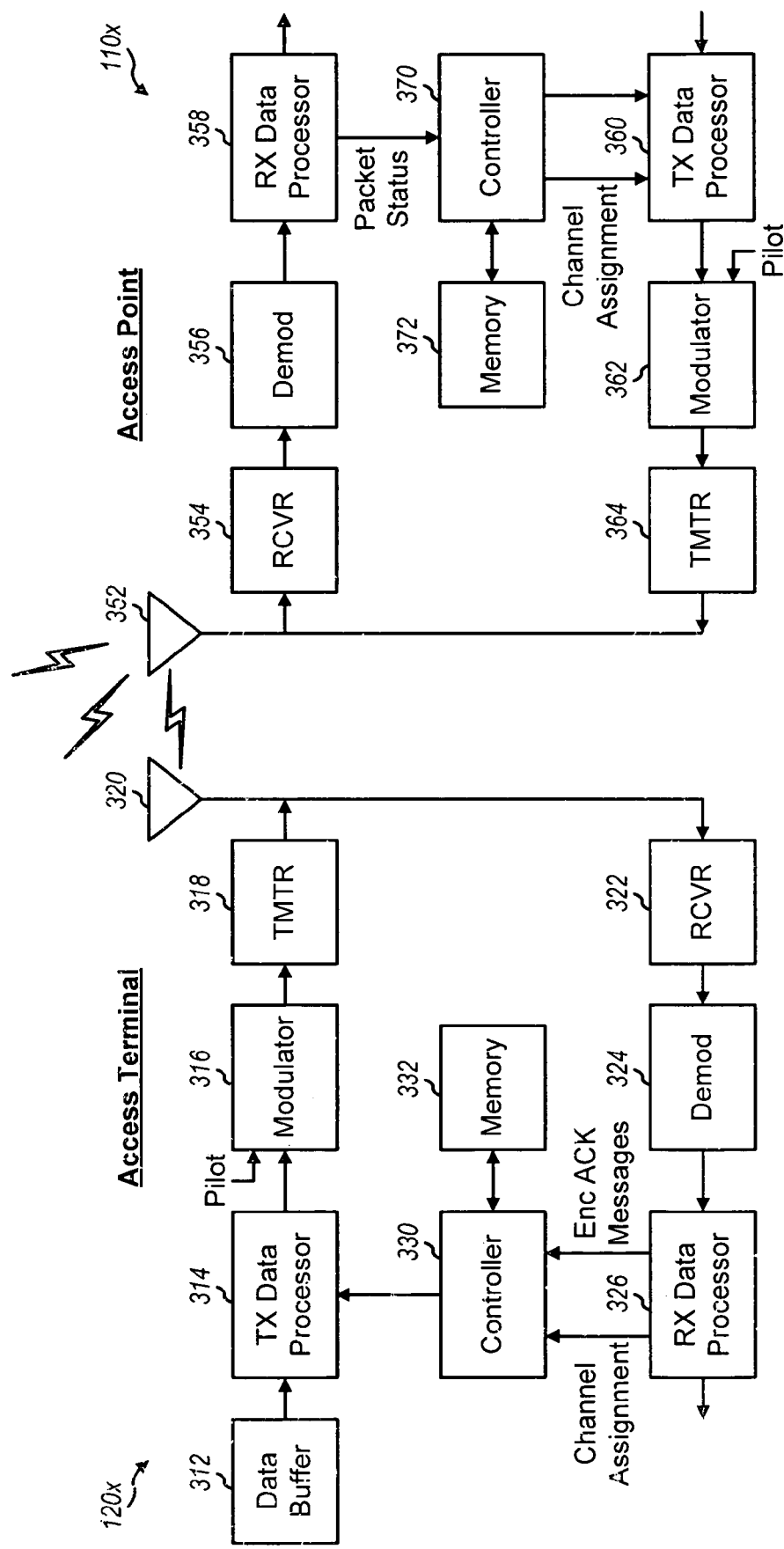
FIG. 3 shows a block diagram of an access point and an access terminal.

FIG. 3 shows a block diagram of a access point 110x and an access terminal 120x, for implementing interlace allocation and designation as discussed above in connection with FIG. 1 and FIG. 2. For the reverse link, at terminal 120x, a transmit (TX) data processor 314 receives traffic data from a data buffer 312, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 316 receives the data symbols, pilot symbols, and possibly signaling for the reverse link, performs OFDM modulation and/or other processing as specified by the system, and provides a stream of output chips. A transmitter unit (TMTR) 318 processes (e.g., converts to analog, filters, amplifies, and frequency up converts) the output chip stream and generates a modulated signal, which is transmitted from an antenna 320.

At access point 10x, the modulated signals transmitted by terminal 120x and other terminals in communication with access point 10x are received by an antenna 352. A receiver unit (RCVR) 354 processes (e.g., conditions and digitizes) the received signal from antenna 352 and provides received samples. A demodulator (Demod) 356 processes (e.g., demodulates and detects) the received samples and provides detected data symbols, which are noisy estimate of the data symbols transmitted by the terminals to access point 110x. A receive (RX) data processor 358 processes (e.g., symbol demaps, deinterleaves, and decodes) the detected data symbols for each terminal and provides decoded data for that terminal.

For the forward link, at access point 110x, traffic data is processed by a TX data processor 360 to generate data symbols. A modulator 362 receives the data symbols, pilot symbols, and signaling for the forward link, performs OFDM modulation and/or other pertinent processing, and provides an output chip stream, which is further conditioned by a transmitter unit 364 and transmitted from antenna 352. The forward link signaling may comprise power control commands generated by a controller 370 for all terminals transmitting on the reverse link to base station 10x. At terminal 120x, the modulated signal transmitted by base station 110x is received by antenna 320, conditioned and digitized by a receiver unit 322, and processed by a demodulator 324 to obtain detected data symbols. An RX data processor 326 processes the detected data symbols and provides decoded data for the terminal and the forward link signaling. Controller 330 receives the power control commands, and controls data transmission and transmits power on the reverse link to access point 110x. Controllers 330 and 370 direct the operation of terminal 120x and access point 110x, respectively. Memory units 332 and 372 store program codes and data used by controllers 330 and 370, respectively, to implement the frame interlace allocation and designation as discussed above.

Figure 4:
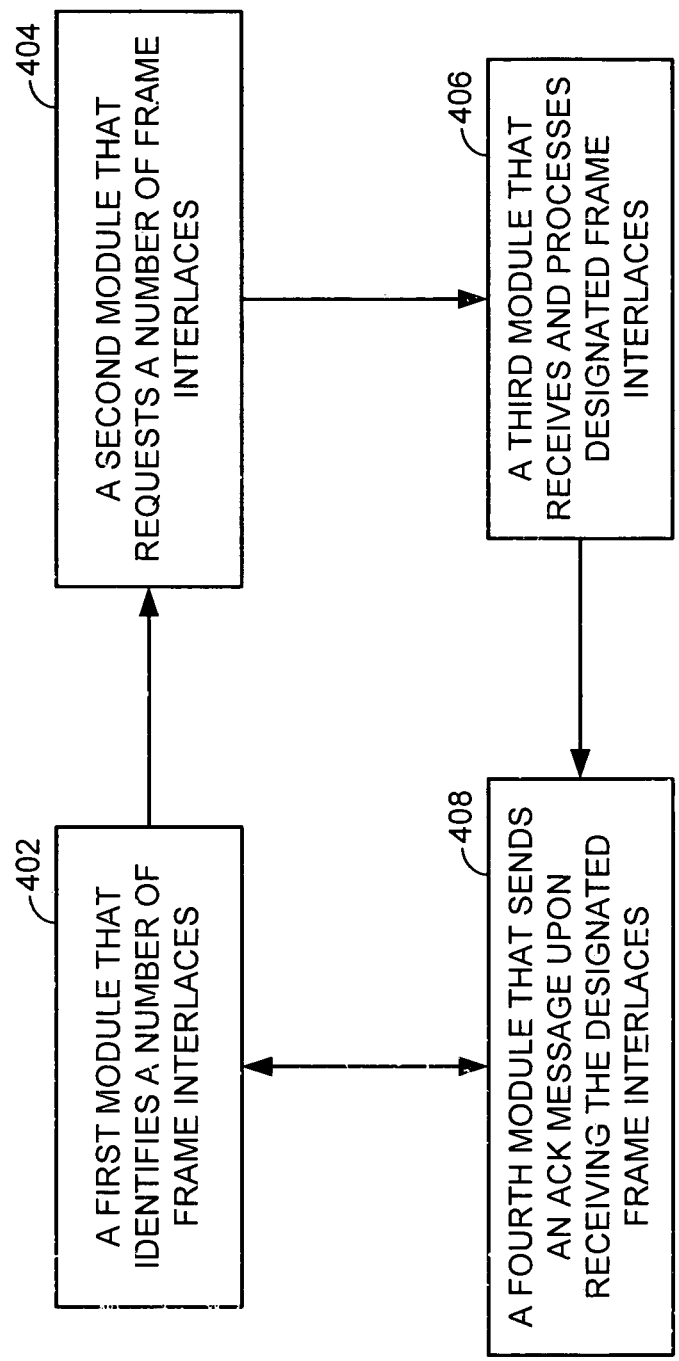
FIG. 4 shows one embodiment of an access terminal.

FIG. 4 shows one embodiment of an access terminal. The processing units in the AT may include a first module 402 that identifies a number of frame interlaces, e.g., based on at least the available power on the AT, a second module 404 that requests a number of frame interlaces from an AP, a third module 406 that receives and processes designated frame interlaces, and a four module 408 that sends an ACK message to the AP upon receiving the designated frame interlaces.

Figure 5:
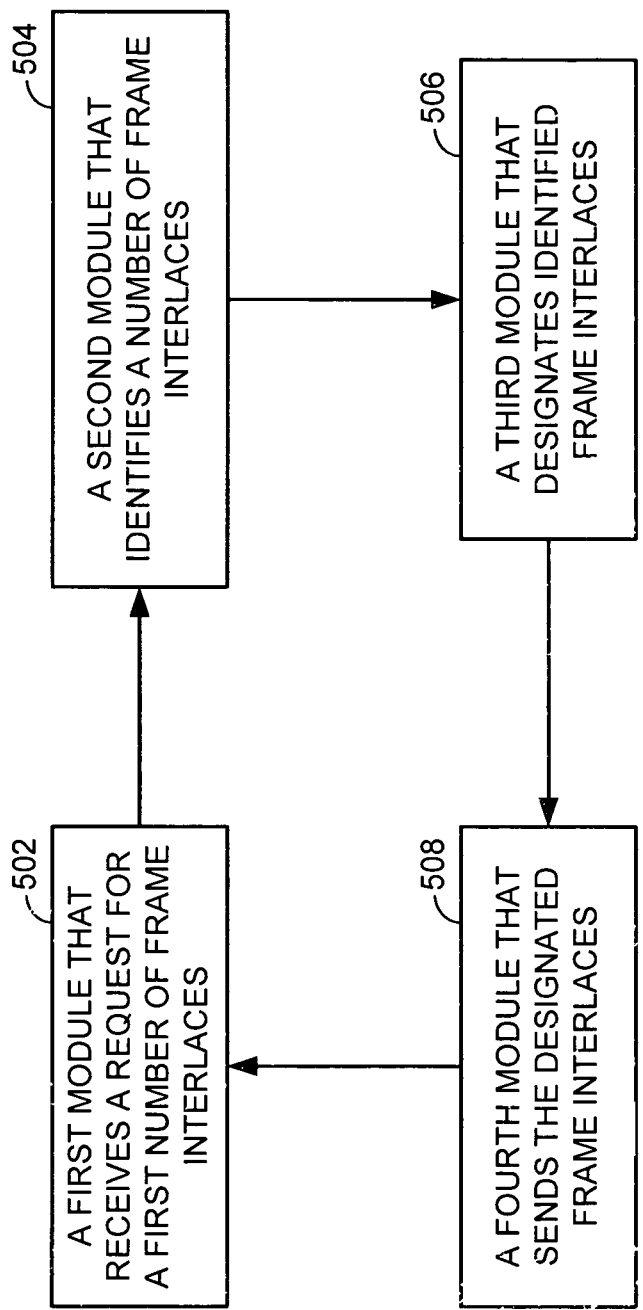
FIG. 5 shows one embodiment of an access point.

FIG. 5 shows one embodiment of an access point. The processing units in the AP may include a first module 502 that receives a request from one or more ATs for a number of frame interlaces, a second module 504 that identifies a number of frame interlaces, a third module 506 that designates the identified frame interlaces, and a fourth module 508 that sends the designates frame interlaces to one or more ATs.

Figure 6:
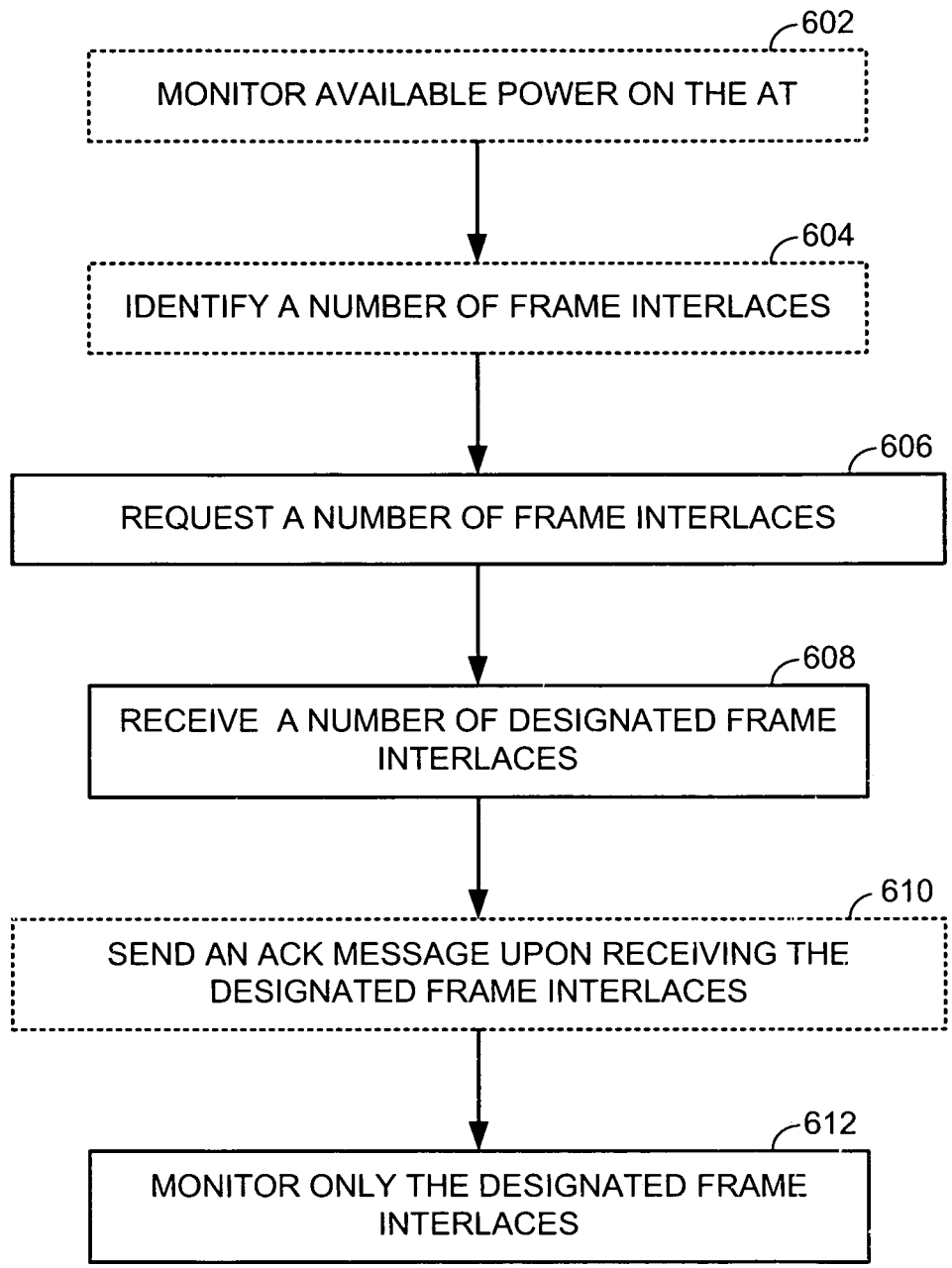
FIG. 6 shows a flow diagram for an access terminal.

FIG. 6 shows a flow diagram for an access terminal. In one embodiment, the AT may monitor some factors on the AT, such as the available power, in step 602. The AT may also identify, in step 604, a number of frame interlaces that the AT may support, e.g., based on the determined available power at the AT. Whether or not the AT performs steps 602 and 604 initially, the AT requests a number of frame interlaces, in step 606. The AT may receive a number of designated frame interlaces, in step 608, optionally send an ACK message upon receiving the designated frame interlaces, in step 610, and start monitoring only the designated frame interlaces, in step 612, thus saving power.

Figure 7:
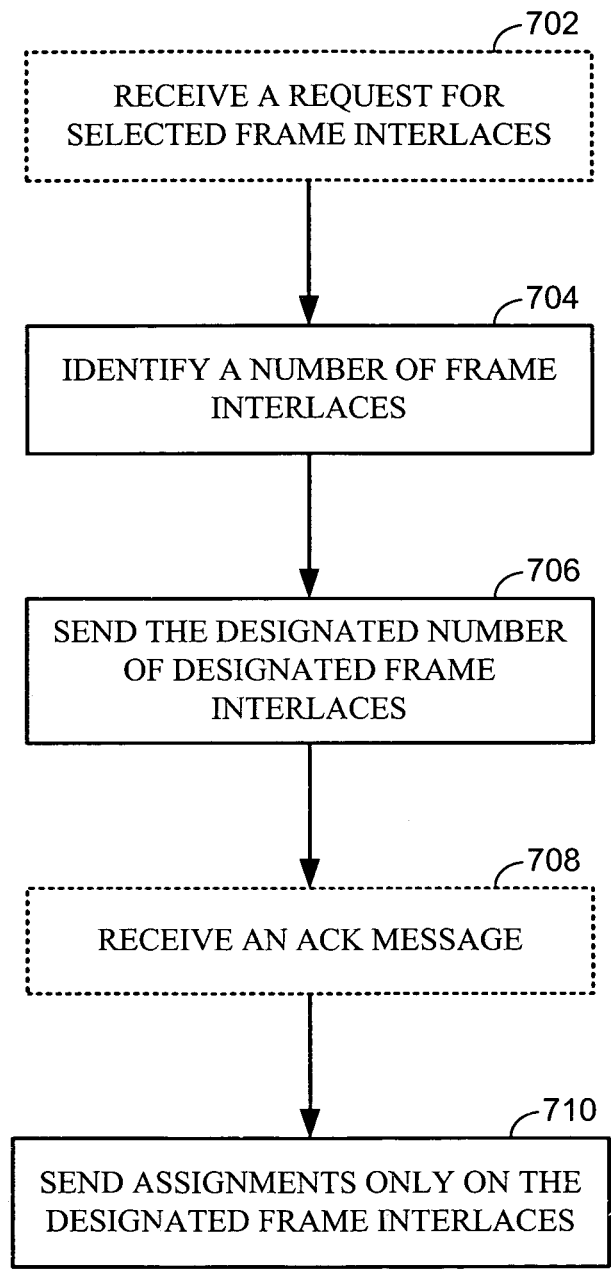
FIG. 7 shows a flow diagram for an access point.

FIG. 7 shows a flow diagram for an access point. In one embodiment, the AP may receive requests for selected frame interlaces, in step 702, from at one or more ATs. Whether or not the AP receives a request, the AP identifies and designates a number of frame interlaces, in step 704, and sends the designated number of designated frame interlaces to the AT, in step 706. The AP may receive, in step 708, an ACK message if one has been send by the AT. The AP sends assignments to the target AT only on the designated frame interlaces, in step 710.

According to the disclosed embodiments, the AP and the ATs may negotiate on a set of designated frame interlaces that the AP may employ to communicate information, thereby allowing the AT to monitor only the designated frames. Therefore, a target AT would not need to waste limited power to monitor all the frames.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 332 or 372 in FIG. 3) and executed by a processor (e.g., controller 330 or 370). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for changing from a first number of frame interlaces to a second number of frame interlaces, the method comprising:
   receiving a request to change frame interlaces, the request including a supportable number of frame interlaces;
   identifying the second number of frame interlaces based on the supportable number of frame interlaces; and
   transmitting the identified second number of frame interlaces to an access terminal, the second number of frame interlaces identifying those frame interlaces that the access terminal is required to monitor.

2. The method of claim 1, wherein the second number is smaller than the first number, when the available power at the access terminal has decreased.

3. The method of claim 1, wherein the second number is larger than the first number, when the available power at the access terminal has increased.

4. The method of claim 1, wherein said identifying comprises not assigning of the same frame interlace to two or more access terminals (ATs).

5. The method of claim 1, wherein said identifying comprises aligning one of the identified frame interlaces on frames that carry power control channel.

6. The method of claim 5, wherein said identifying comprises aligning a second one of the identified frame interlaces on frames adjacent to frames that carry power control channel.

7. The method of claim 1, wherein said identifying comprises identifying the frame interlaces based on a request from an AT.

8. The method of claim 1, further comprising receiving an acknowledgement message generated by the AT in response to transmitting said second number of frame interlaces.

9. The method of claim 1, wherein the supportable number of frame interlaces is based on the available power at the access terminal.

10. A non-transitory computer-readable medium embodying program code for implementing a method for changing from a first number of frame interlaces to a second number of frame interlaces, the method comprising:
    receiving a request to change frame interlaces, the request including a supportable number of frame interlaces;
    identifying the second number of frame interlaces based on the supportable number of frame interlaces; and
    transmitting the identified second number of frame interlaces to an access terminal, the second number of frame interlaces identifying those frame interlaces that the access terminal is required to monitor.

11. The non-transitory computer readable medium of claim 10, wherein said identifying comprises not assigning the same frame interlace to two or more access terminals (ATs).

12. The non-transitory computer readable medium of claim 10, wherein said identifying comprises aligning one of the identified frame interlaces on frames that carry power control channel.

13. The non-transitory computer readable medium of claim 12, wherein said identifying comprises aligning a second one of the identified frame interlaces on frames adjacent to frames that carry power control channel.

14. The non-transitory computer readable medium of claim 10, wherein said identifying comprises identifying the frame interlaces based on a request from an AT.

15. The non-transitory computer readable medium of claim 10, further comprising receiving an acknowledgement message generated by the AT in response to transmitting said second number of frame interlaces.

16. The non-transitory computer readable medium of claim 10, wherein the supportable number of frame interlaces is based on the available power at the access terminal.

17. An apparatus for changing from a first number of frame interlaces to a second number of frame interlaces, comprising:
    means for receiving a request to change frame interlaces, including a supportable number of frame interlaces;
    means for identifying the second number of frame interlaces based on the supportable number of frame interlaces; and
    means for transmitting the identified second number of frame interlaces to an access terminal, the second number of frame interlaces identifying those frame interlaces that the access terminal is required to monitor.

18. The apparatus of claim 17, wherein said identifying comprises means for not assigning of the same frame interlace to two or more access terminals (ATs).

19. The apparatus of claim 17, wherein said identifying comprises means for aligning one of the identified frame interlaces on frames that carry power control channel.

20. The apparatus of claim 19, wherein said identifying comprises means for aligning a second one of the identified frame interlaces on frames adjacent to frames that carry power control channel.

21. The apparatus of claim 17, wherein said identifying comprises means for identifying the frame interlaces based on a request from an AT.

22. The apparatus of claim 17, further comprising means for receiving an acknowledgement message generated by the AT in response to transmitting said second number of frame interlaces.

23. The apparatus of claim 17, wherein the supportable number of frame interlaces is based on the available power at the access terminal.

24. At least one processor configured for changing from a first number of frame interlaces to a second number, the processor comprising:
    a first module that receives a request to change frame interlaces, the request including a supportable number of frame interlaces;
    a second module that identifies the second number of frame interlaces based on the supportable number of frame interlaces; and
    a third module that transmits the identified second number of frame interlaces to an access terminal, the second number of frame interlaces, identifying those frame interlaces that the access terminal is required to monitor.

25. The processor of claim 24, wherein the second number is smaller than the first number, when the available power at the access terminal has decreased.

26. The processor of claim 24, wherein the second number is larger than the first number, when the available power at the access terminal has increased.

27. The processor of claim 24, wherein said second module does not assign the same frame interlace to two or more access terminals (ATs).

28. The processor of claim 24, wherein said second module aligns one of the identified frame interlaces on frames that carry power control channel.

29. The processor of claim 28, wherein said second module aligns a second one of the identified frame interlaces on frames adjacent to frames that carry power control channel.

30. The processor of claim 24, wherein said second module identifies the frame interlaces based on a request from an AT.

31. The processor of claim 24, further comprising receiving an acknowledgement message generated by the AT in response to transmitting said second number of frame interlaces.

32. The processor of claim 24, wherein the supportable number of frame interlaces is based on the available power at the access terminal.

* * * * *